United States Patent
Yang et al.

(10) Patent No.: US 9,591,355 B2
(45) Date of Patent: Mar. 7, 2017

(54) DECODING VIDEO STREAMS USING DECODERS SUPPORTING A DIFFERENT ENCODING PROFILE

(71) Applicant: Broadcom Corporation, Irvine, CA (US)

(72) Inventors: Zhijie Yang, Irvine, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1031 days.

(21) Appl. No.: 13/655,878

(22) Filed: Oct. 19, 2012

(65) Prior Publication Data

US 2014/0112383 A1 Apr. 24, 2014

(51) Int. Cl.
*H04N 19/40* (2014.01)
*H04N 21/44* (2011.01)

(52) U.S. Cl.
CPC ............. *H04N 21/44* (2013.01); *H04N 19/40* (2014.11)

(58) Field of Classification Search
None
See application file for complete search history.

(56) References Cited

U.S. PATENT DOCUMENTS

| | | | | |
|---|---|---|---|---|
| 6,389,174 B1 * | 5/2002 | Liu | ............................. | H04N 7/15 348/E7.083 |
| 7,061,410 B1 * | 6/2006 | Pearson | .................. | H04N 19/40 341/106 |
| 7,595,743 B1 * | 9/2009 | Winger | ................... | H04N 19/13 341/107 |
| 8,325,821 B1 * | 12/2012 | Kizhepat | ........ | H04N 21/234345 375/240.26 |
| 2005/0232497 A1 * | 10/2005 | Yogeshwar | ............ | H04N 19/56 382/232 |
| 2007/0143800 A1 * | 6/2007 | Salomons | ............... | H04N 7/163 725/74 |
| 2008/0175325 A1 * | 7/2008 | Hannuksela | ......... | H04N 21/222 375/240.26 |
| 2009/0016446 A1 * | 1/2009 | Yang | ................. | H04N 21/23439 375/240.25 |
| 2009/0116546 A1 * | 5/2009 | Park | ..................... | H04N 19/176 375/240.01 |

OTHER PUBLICATIONS

Wenger, S. et al., RTP Payload Format for Scalable Video Coding, draft-ietf-avt-rtp-svc-27.txt (Feb. 1, 2011).*
AVS Communication No. 76 dated Sep. 30, 2012.*
Translation of AVS Communication No. 76 dated Sep. 30, 2012.*
"LS to ITU-T FG IPTV on video coding technology selection and testing", ITU-T SG 16 Incoming Liaison Statement, FG IPTV-IL-0029 (Jan. 2007).*

* cited by examiner

*Primary Examiner* — William C Vaughn, Jr.
*Assistant Examiner* — Lindsay Uhl
(74) *Attorney, Agent, or Firm* — Foley & Lardner LLP

(57) ABSTRACT

In various embodiments, video streams are decoded using decoders that support a different decoding profile. First processing circuitry is configured to receive a video stream encoded using a first encoding profile, transcode the video stream from the first encoding profile to a second encoding profile, and store the transcoded video stream in an output buffer. Second processing circuitry is configured to receive the transcoded video stream from the output buffer and decode the transcoded video stream according to the second encoding profile. The second processing circuitry may be unable to decode the video stream encoded using the first encoding profile.

15 Claims, 6 Drawing Sheets

DECODING VIDEO STREAMS USING DECODERS SUPPORTING A DIFFERENT ENCODING PROFILE

BACKGROUND

Audio Video Standard (AVS) is a compression standard for digital video and audio developed by the Audio and Video Coding Standard Committee of the People's Republic of China. AVS1-P2 ("Jizhun"), the original encoding profile, has been in use for several years. The first AVS1-P2-profile-compliant single-chip high definition set-top box solution was released during the 2008 China Content Broadcasting Network (CCBN) exhibition. Since then, millions of devices with AVS1-P2 support have been deployed in the market.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to decoding video streams with decoders that support a different encoding profile. AVS1-P16 ("Guangbo") is a new AVS encoding profile developed by the Audio and Video Coding Standard Committee of the People's Republic of China. AVS1-P16 is more advanced than AVS1-P2 and is directed toward broadcasting applications. AVS1-P16 introduces several new encoding tools, including advanced entropy coding (AEC), enhanced PB field coding, and adaptive weighted quantization. AEC employs a context-adaptive arithmetic coding to improve coding efficiency beyond the context-based adaptive two-dimensional variable length coding (CA-2D-VLC) employed by AVS1-P2. The use of AEC versus VLC provides significant coding gain in AVS1 P16 over AVS1-P2. Enhanced PB field coding further refines the skip/direct motion vector derivation process for P and B field pictures. Enhanced PB field coding may be used in the interlaced coding process. Adaptive weighted quantization quantizes the coefficients within a macroblock differently from AVS1-P2 to further improve subjective visual quality.

Although AVS1-P16 presents advantages over AVS1-P2, AVS1-P2 decoding hardware remains widely deployed and available. Various embodiments of the present disclosure facilitate decoding of AVS1 P16 streams using existing AVS1-P2 hardware. Existing AVS1-P2 hardware may have a first processor that is configured to decode the audio portion of the AVS stream independently of the video portion, which is processed by a second processor. As will be described herein, in one embodiment, this first processor may be configured to transcode an AVS1-P16 video stream into an AVS1-P2 video stream. The AVS1-P2 stream may, in turn, be decoded by the second processor. In another embodiment, the second processor may be configured to perform a portion of the AVS1-P16 decoding. Although the discussion herein primarily focuses on AVS1-P2 hardware and AVS1-P16 streams, it is understood that the principles of the present disclosure are applicable to other video decoding standards with differing encoding profiles. In the following discussion, a general description of the system and its components is provided, followed by a discussion of the operation of the same.

Figure 1A:
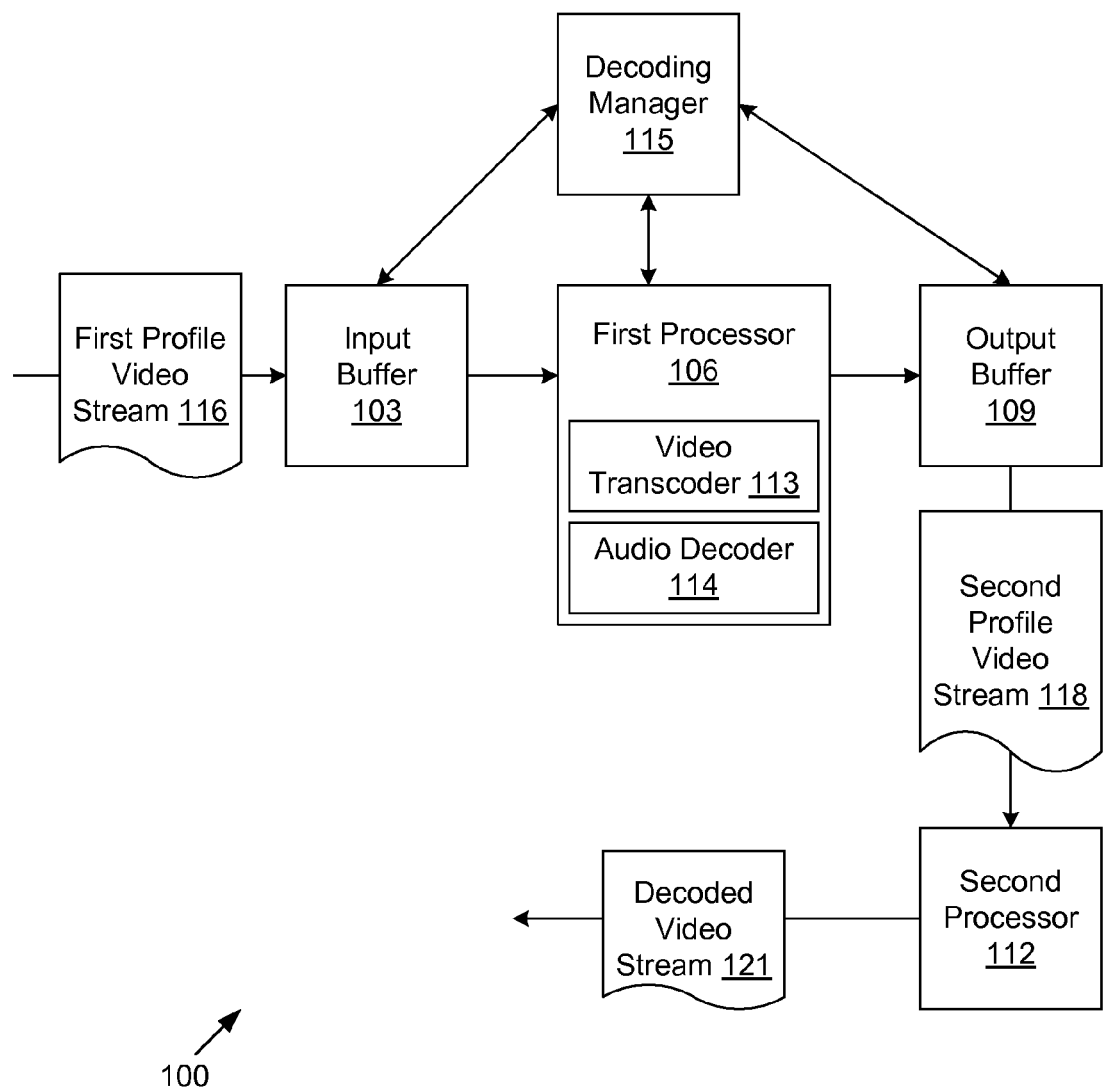
FIG. 1A depicts an exemplary video decoder according to various embodiments of the present disclosure.

FIG. 1A depicts an exemplary video decoder 100 according to various embodiments of the present disclosure. The video decoder 100 includes an input buffer 103, a first processor 106, an output buffer 109, and a second processor 112. The first processor 106 may execute a video transcoder 113 and/or an audio decoder 114, among other components. A decoding manager 115 may be included in the video decoder 100 in some embodiments. The decoding manager 115 may be implemented by code executed by the first processor 106 or other circuitry in the video decoder 100. The input buffer 103 and output buffer 109 may correspond to areas in a system memory or may correspond to dedicated buffers.

The video decoder 100 may be employed in a set-top box, a television, a computer, a mobile device, and/or other devices that may be employed to decode video streams. The video decoder 100 may initially be configured to decode video streams that correspond to AVS1-P2. In such an initial configuration, AVS1-P16 streams may be unsupported. However, as will be described, such a video decoder 100 may be reconfigured or updated to support AVS1-P16.

In some embodiments, the first processor 106 may correspond to a host processor or other relatively powerful, multi-tasking processor. The processing power of the first processor 106 may be selected based at least in part on the peak processing requirements of a given number of streams that are to be processed concurrently. Other processing circuitry may be employed for the first processor 106 in other embodiments. Under an initial configuration, the first processor 106 may be configured to decode the audio portion of a video stream using the audio decoder 114.

The second processor 112 may correspond to a video decoder chip or other processing circuitry. The second processor 112 may be initially configured to support AVS1 P2 but not AVS1-P16. In some embodiments, the second processor 112 may be incapable of full support for AVS1-P16. For example, the second processor 112 may be incapable of performing AEC decoding. In one embodiment, the second processor 112 may be updated (e.g., with a firmware update or other update) to decode AVS1-P16 formatted bitstreams that do not employ AEC. Both the first processor 106 and the second processor 112 may be powerful enough to process multiple video streams concurrently, e.g., for picture-in-picture video streams, three-dimensional (3D) video streams, multi-view video streams, and so on.

Next, a general description of the operation of the various components of the video decoder 100 is provided. A first profile video stream 116 arrives at the video decoder 100 and is stored in the input buffer 103. The first profile video stream 116 may correspond, for example, to an AVS1-P16 stream that employs AEC. The first profile video stream 116 may be divided into network abstraction layer (NAL) units or other portions.

The first processor 106 reads one or more portions of the first profile video stream 116 from the input buffer 103. The first processor 106 may transcode the first profile video stream 116 into a second profile video stream 118 using the video transcoder 113. For example, the first processor 106 may transcode the AVS1-P16 stream into an AVS1-P2 stream. Such transcoding may be performed losslessly using syntax-level conversion when enhanced PB field coding and adaptive weighted quantization is disabled. If either enhanced PB field coding or adaptive weighted quantization is enabled, the transcoding process may become a lossy process since AVS1-P2 does not have corresponding syntax elements. Additionally, the first processor 106 may decode the audio portion of the first profile video stream 116. The video transcoding and/or the audio decoding may be performed within digital signal processors (DSPs) of the first processor 106 when available. The second profile video stream 118 generated by the first processor 106 is stored in the output buffer 109.

The second processor 112 reads the second profile video stream 118 from the output buffer 109 and decodes the second profile video stream 118. As previously discussed, the second profile video stream 118 may be an AVS1-P2 stream that the second processor 112 is configured to decode. In decoding the second profile video stream 118, the second processor 112 generates a decoded video stream 121, which may comprise uncompressed video.

In some embodiments, the decoding manager 115 may be employed to synchronize the decoding of an audio portion of the first profile video stream 116, the transcoding of the first profile video stream 116 into the second profile video stream 118, and, consequently, the decoding of the second profile video stream 118 into the decoded video stream 121. Problems relating to lip synchronization and so on may arise because the audio decoding and the video transcoding are performed in the same first processor 106. Problems may also arise relating to transcoding of multiple first profile video streams 116 concurrently by the first processor 106. When video transcoding is enabled, a pts_offset_transcode parameter may be added to the audio presentation time stamp (PTS) to compensate for the longer audio decoding delay caused by sharing processing power of the first processor 106 with the video transcoder 113.

Figure 1B:
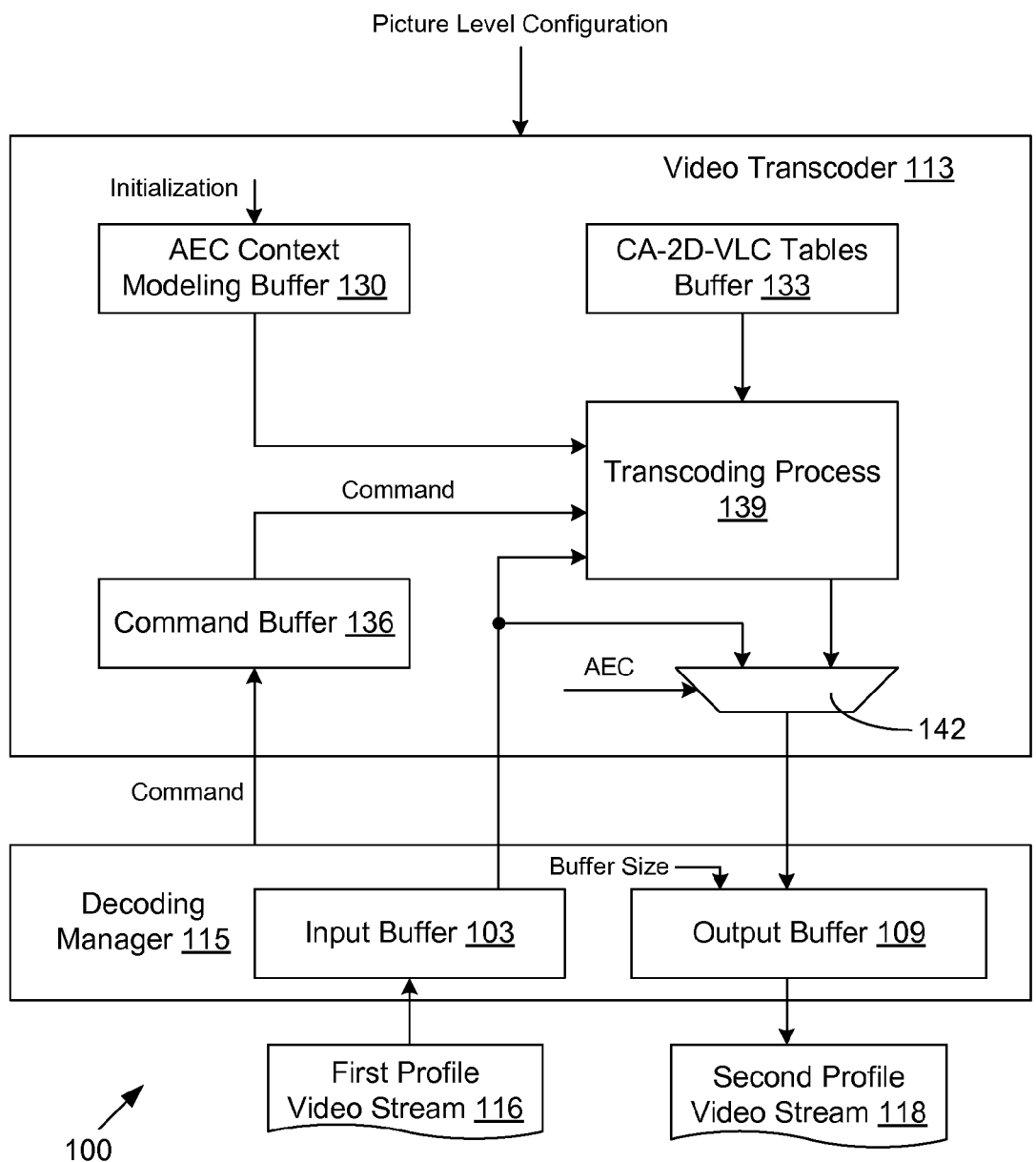
FIG. 1B is a diagram depicting an exemplary video transcoder and an exemplary decoding manager in the exemplary video decoder of FIG. 1A according to various embodiments of the present disclosure.

The decoding manager 115 may also manage the input buffer 103 and allocate the output buffer 109 as will be discussed with respect to FIG. 1B. FIG. 1B is a diagram depicting an exemplary video transcoder 113 and an exemplary decoding manager 115 in the exemplary video decoder 100 according to various embodiments of the present disclosure. Referring now to FIG. 1B, the video transcoder 113 includes an AEC context modeling buffer 130, a CA-2D-VLC tables buffer 133, a command buffer 136, a transcoding process 139, a multiplexer 142, and/or other components. The decoding manager 115 controls the input buffer 103 and the output buffer 109.

In operation, the input buffer 103 obtains the first profile video stream 116. The data from the input buffer 103 is provided both to the transcoding process 139 and to the multiplexer 142. The video transcoder 113 obtains picture level configuration parameters and initializes the AEC context modeling buffer 130. Data from the AEC context modeling buffer 130 and the CA-2D-VLC tables buffer 133 is provided to the transcoding process 139. Various commands from the decoding manager 115 are provided to the command buffer 136 of the video transcoder 113, and these commands are subsequently provided to the transcoding process 139. The output data from the transcoding process 139 is provided to the multiplexer 142.

An AEC parameter provided to the multiplexer 142 controls which data is provided to the output buffer 109, either the output from the transcoding process 139 or data directly from the input buffer 103. A buffer size parameter is provided to the output buffer 109 by the decoding manager 115 in order to allocate the memory size of the output buffer 109. The buffer size may be derived using a linear function of the input NAL unit size and the picture size, e.g., a*input_NAL_unit_size+b*picture_size, where a and b are either fixed constants or configurable parameters. These parameters may also be determined by the encoder and sent to the decoder. The output from the output buffer 109 corresponds to the second profile video stream 118.

Referring back to FIG. 1A, in an alternative embodiment, the second processor 112 may be capable of being updated. For example, the firmware for the second processor 112 may be updated. In such a case, the second profile video stream 118 may correspond to an intermediate encoding profile. As a nonlimiting example, the second profile video stream 118 may have headers corresponding to AVS1-P16 but use CA-2D-VLC rather than AEC. The second processor 112 may be updated to handle the AVS1-P16 header format but AEC may remain unsupported. Thus, the first processor 106 may be configured to transcode AEC data into CA-2D-VLC data, while still providing an AVS1 P16-formatted bitstream.

Updating the second processor 112 may facilitate decoding of streams in which enhanced PB field coding is enabled. When enhanced PB field coding is enabled, an AVS1-P16 profile bitstream may not be able to be transcoded into an AVS1-P2 profile bitstream losslessly by way of syntax-level conversion. The AVS1-P16-formatted bitstream may be employed instead of an AVS1-P2-formatted bitstream in order to enable enhanced PB field coding.

When adaptive weighted quantization is enabled in the original AVS1-P16 stream, the transcoding/decoding process may become a lossy process by either flipping the weight_quant_flag inside the first processor 106 or treating the weighting_quant_flag as zero inside the second processor 112.

Figure 2:
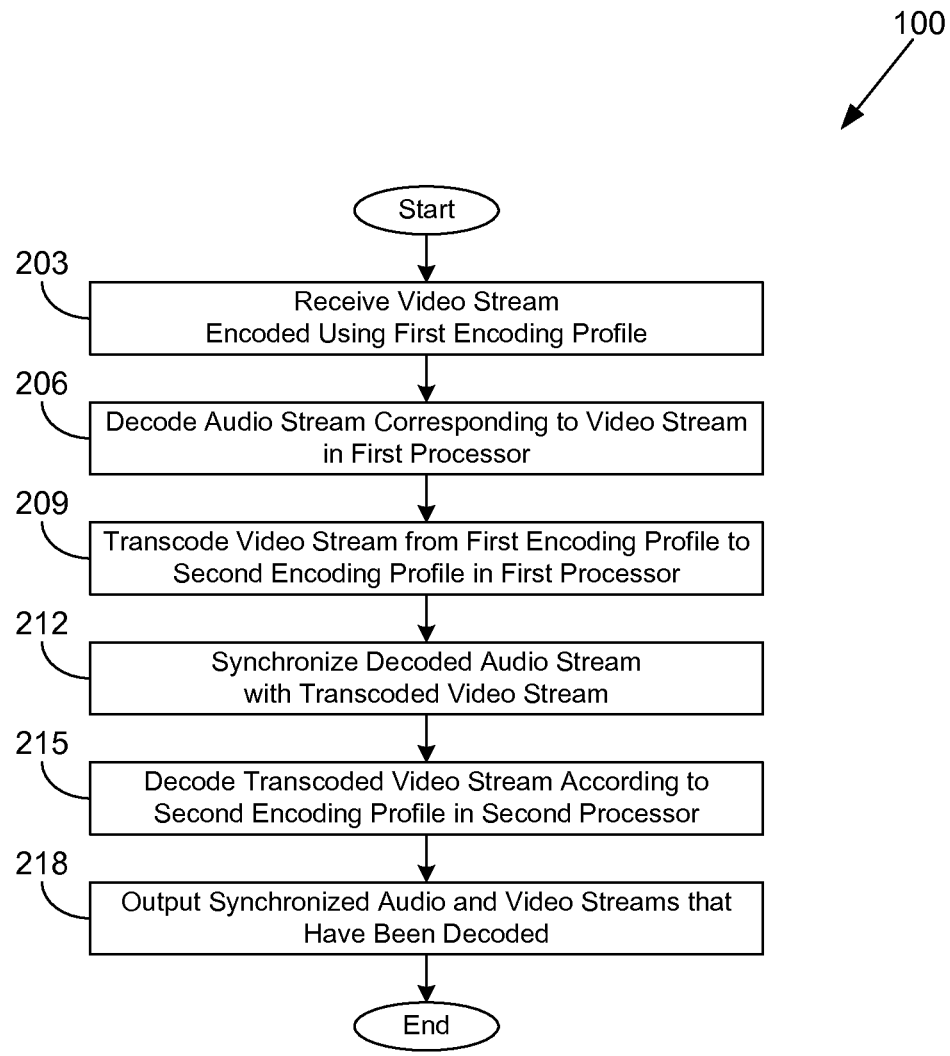
FIG. 2 depicts an exemplary flowchart that provides one example of the operation of the exemplary video decoder of FIG. 1A according to various embodiments of the present disclosure.

FIG. 2 depicts an exemplary flowchart that provides one example of the operation of the exemplary video decoder 100 (FIG. 1A) according to various embodiments. It is understood that the flowchart of FIG. 2 provides merely an example of the many different types of functional arrangements that may be employed to implement the operation of the video decoder 100 as described herein. As an alternative, the flowchart of FIG. 2 may be viewed as depicting an example of steps of a method implemented in the video decoder 100 according to one or more embodiments.

Beginning with reference numeral 203, the video decoder 100 receives a first profile video stream 116 (FIG. 1A) that has been encoded using a first encoding profile, e.g., AVS1-P16, etc. The first profile video stream 116 may be stored in the input buffer 103 (FIG. 1A). At reference numeral 206, the video decoder 100 decodes an audio stream corresponding to the first profile video stream 116 in the first processor 106 (FIG. 1A). At reference numeral 209, the video decoder 100 transcodes the first profile video stream 116 from the first encoding profile to a second encoding profile (e.g., AVS1-P2, AVS1-P16 with CA-2D-VLC data, etc.). If the video decoder 100 determines that adaptive weighted quantization is enabled in the first profile video stream 116, the video decoder 100 may be configured to perform the transcoding as a lossy process in the first processor 106. Accordingly, a second profile video stream 118 (FIG. 1A) is generated and may be written to the output buffer 109 (FIG. 1A).

At reference numeral 212, the video decoder 100 synchronizes a decoded audio stream with the transcoded video stream. At reference numeral 215, the video decoder 100 decodes the transcoded video stream i.e., the second profile video stream 118) according to the second encoding profile in the second processor 112 (FIG. 1A). If the video decoder 100 determines that adaptive weighted quantization is enabled in the second profile video stream 118, the video decoder 100 may be configured to perform the decoding as a lossy process in the second processor 112. At reference numeral 218, the video decoder 100 outputs the decoded video and audio streams that have been synchronized as a decoded video stream 121 (FIG. 1A). Thereafter, the operation of the video decoder 100 ends.

Figure 3:
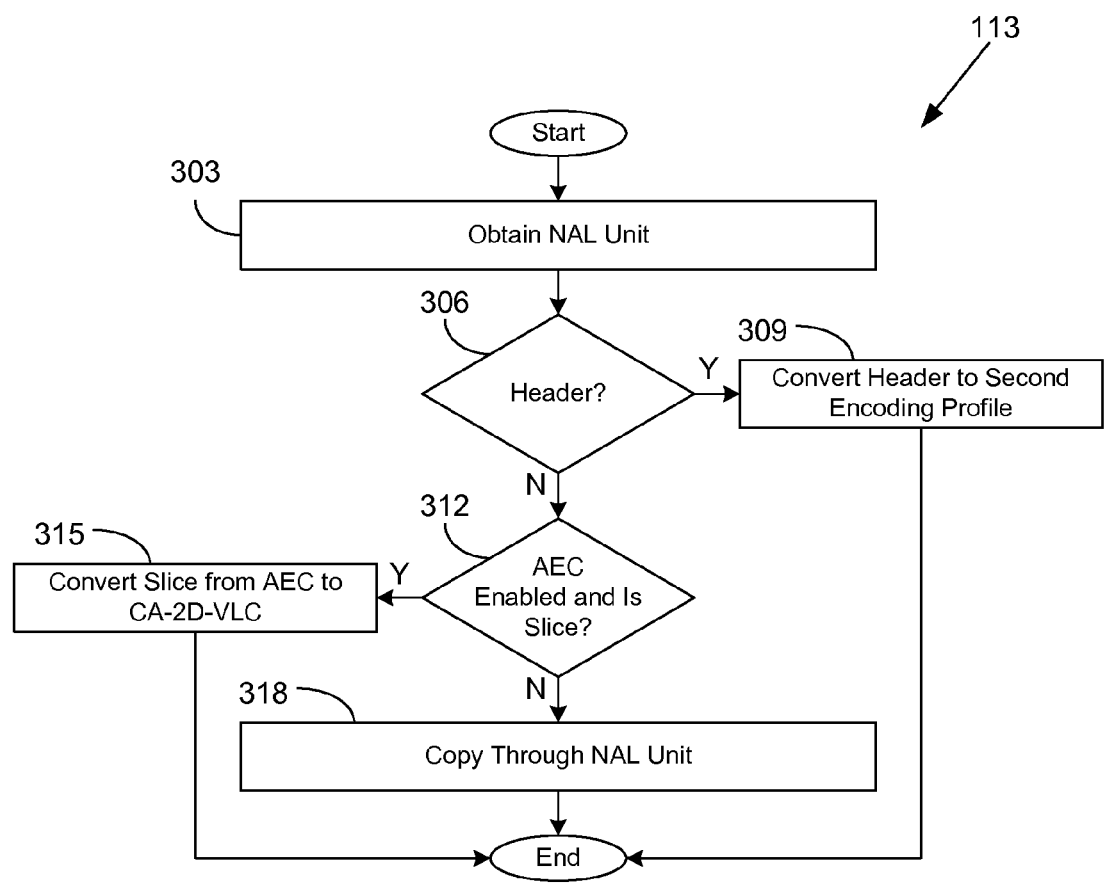
FIG. 3 depicts an exemplary flowchart that provides one example of the operation of a portion of an exemplary video transcoder executed in a first processor in the exemplary video decoder of FIG. 1A according to various embodiments of the present disclosure.

FIG. 3 depicts an exemplary flowchart that provides one example of the operation of a portion of an exemplary video transcoder 113 executed in the first processor 106 (FIG. 1A) in the exemplary video decoder 100 (FIG. 1A) according to various embodiments. It is understood that the flowchart of FIG. 3 provides merely an example of the many different types of functional arrangements that may be employed to implement the operation of the portion of the video transcoder 113 as described herein. As an alternative, the flowchart of FIG. 3 may be viewed as depicting an example of steps of a method implemented in the first processor 106 according to one or more embodiments.

Beginning with reference numeral 303, the video transcoder 113 obtains a NAL unit from the input buffer 103 (FIG. 1A). At reference numeral 306, the video transcoder 113 determines whether the NAL unit corresponds to a header, such as a sequence header, an I picture header, a PB picture header, etc. If so, then the video transcoder 113 converts the header to the second encoding profile at reference numeral 309. Thereafter, the operation of the portion of the video transcoder 113 ends.

if the NAL unit does not correspond to a header, then the video transcoder 113 continues to reference numeral 312. At reference numeral 312, the video transcoder 113 determines whether the NAL unit corresponds to a slice, and if so, whether AEC is enabled. If AEC is enabled and the NAL unit corresponds to a slice, then the video transcoder 113 moves to reference numeral 315 and converts the slice from AEC to CA-2D-VLC. Thereafter, the operation of the portion of the video transcoder 113 ends. If the NAL unit does not correspond to a slice, or if the NAL unit does correspond to a slice but AEC is not enabled, then the video transcoder 113 moves from reference numeral 312 to reference numeral 318 and copies through the NAL unit. Thereafter, the operation of the portion of the video transcoder 113 ends.

Figure 4:
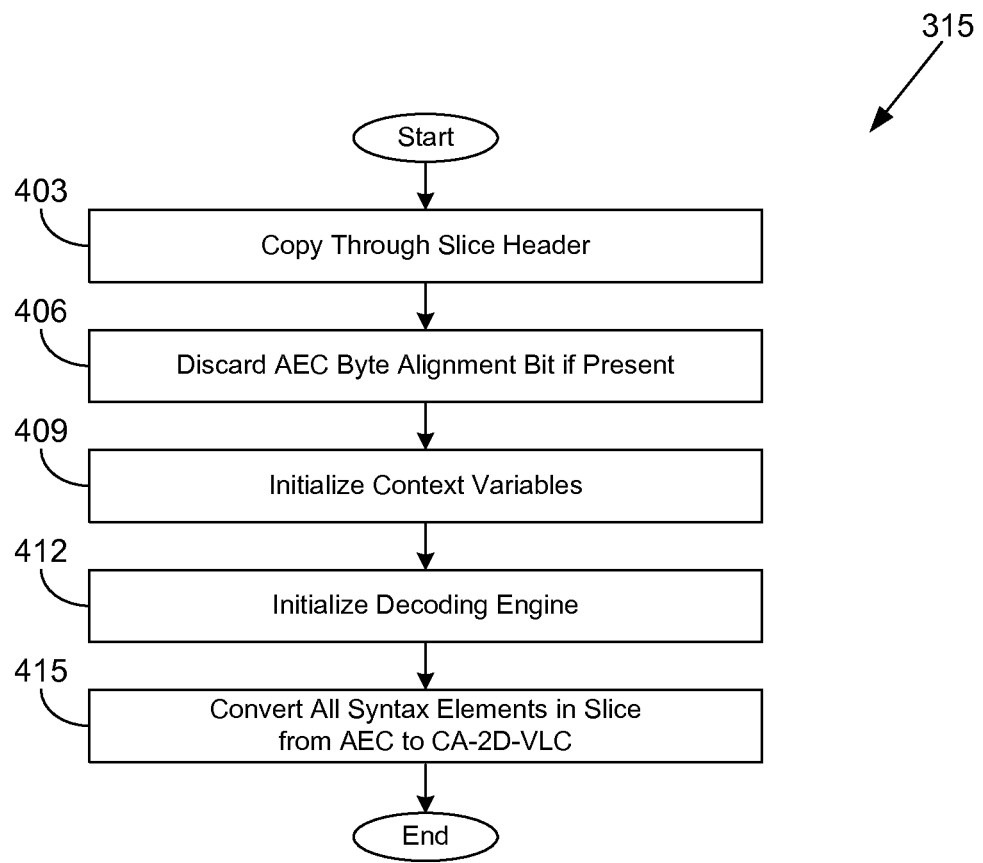
FIG. 4 depicts an exemplary flowchart that provides one example of the operation of another portion of an exemplary video transcoder executed in the first processor in the exemplary video decoder of FIG. 1A according to various embodiments of the present disclosure.

FIG. 4 depicts an exemplary flowchart that provides one example of the operation of another portion of an exemplary video transcoder 113 (FIG. 1A) executed in the first processor 106 (FIG. 1A) in the exemplary video decoder 100 (FIG. 1A) according to various embodiments. Specifically, FIG. 4 relates to reference numeral 315 of the flowchart of FIG. 3, involving conversion of a slice from AEC to CA-2D-VLC. It is understood that the flowchart of FIG. 4 provides merely an example of the many different types of functional arrangements that may be employed to implement the operation of the other portion of the video transcoder 113 as described herein. As an alternative, the flowchart of FIG. 4 may be viewed as depicting an example of steps of a method implemented in the first processor 106 according to one or more embodiments.

Beginning with reference numeral 403, the video transcoder 113 copies through the slice header for the slice. At reference numeral 406, the video transcoder 113 discards the AEC byte alignment bit, if present. At reference numeral 409, the video transcoder 113 initializes context variables for the AEC context. At reference numeral 412, the video transcoder 113 initializes the AEC decoding engine. At reference numeral 415, the video transcoder 113 converts all syntax elements in the slice from AEC to CA-2D-VLC. Each syntax element is associated with a binarization scheme. Bins for each syntax element may be decoded one at a time based at least in part on the context model until a valid binarization for the syntax element is obtained. The syntax element is then encoded using CA-2D-VLC. Thereafter, the portion of the video transcoder 113 ends.

Figure 5:
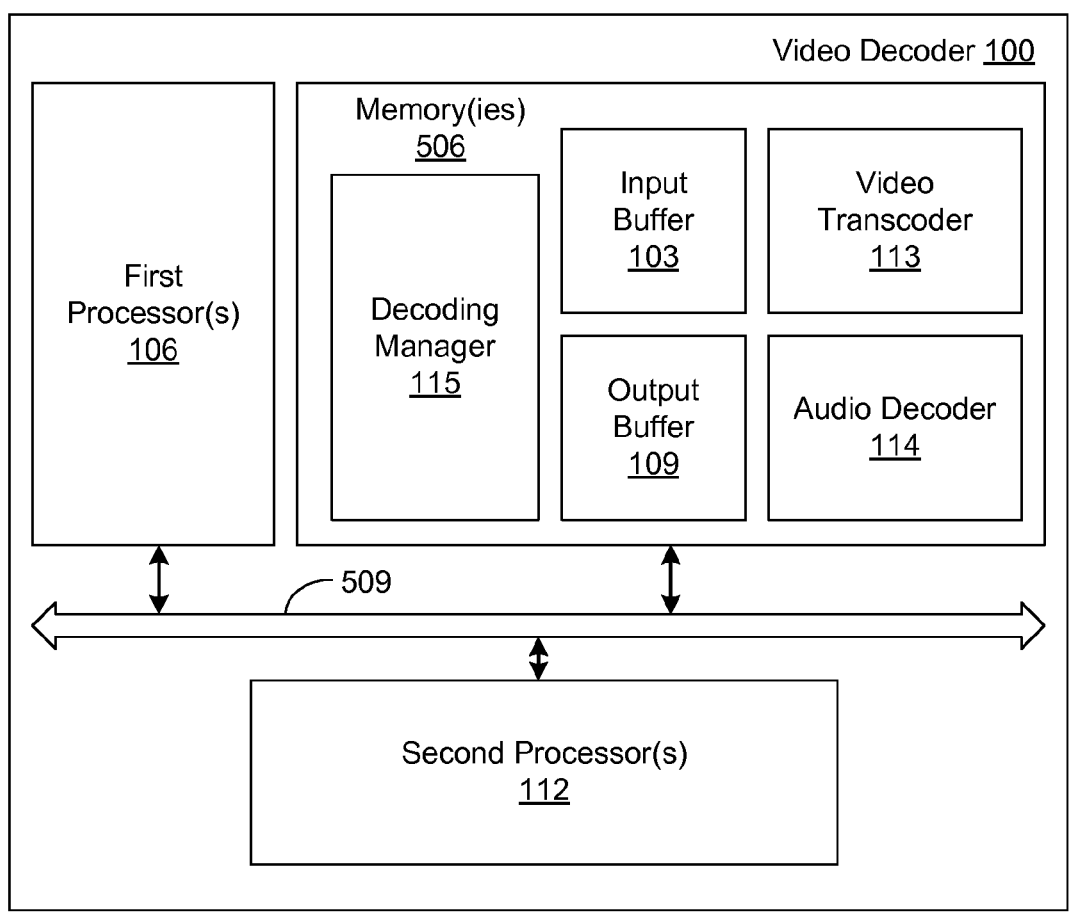
FIG. 5 is an exemplary schematic block diagram that provides another example illustration of the exemplary video decoder of FIG. 1A according to various embodiments of the present disclosure.

FIG. 5 is an exemplary schematic block diagram that provides another example illustration of the exemplary video decoder 100 (FIG. 1A) according to various embodiments of the present disclosure. The video decoder 100 includes at least one processor circuit, for example, having a first processor 106, a second processor 112, and a memory 506, both of which are coupled to a local interface 509. The local interface 509 may comprise, for example, a data bus with an accompanying address/control bus or other bus structure as can be appreciated.

Stored in the memory 506 are both data and several components that are executable by the first processor 106. In particular, stored in the memory 506 and executable by the first processor 106 are the decoding manager 115, the video transcoder 113, the audio decoder 114, and potentially other applications. Also stored in the memory 506 may be the input buffer 103, the output buffer 109, and other data. In addition, an operating system may be stored in the memory 506 and executable by the first processor 106.

It is understood that there may be other applications that are stored in the memory 506 and are executable by the first processor 106 and/or the second processor 112 as can be appreciated. Where any component discussed herein is implemented in the form of software, any one of a number of programming languages may be employed such as, for example, C, C+, C#, Objective C, Java® JavaScript®, Perl, PHP, Visual Basic®, Python®, Ruby, Flash®, or other programming languages.

A number of software components are stored in the memory 506 and are executable by the first processor 106. In this respect, the term "executable" means a program file that is in a form that can ultimately be run by the first processor 106. Examples of executable programs may be, for example, a compiled program that can be translated into machine code in a format that can be loaded into a random access portion of the memory 506 and run by the first processor 106, source code that may be expressed in proper format such as object code that is capable of being loaded into a random access portion of the memory 506 and executed by the first processor 106, or source code that may be interpreted by another executable program to generate instructions in a random access portion of the memory 506 to be executed by the first processor 106, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the first processor 106 and the second processor 112 may represent multiple first processors 106, multiple second processors 112 and/or multiple processor cores and the memory 506 may represent multiple memories 506 that operate in parallel processing circuits, respectively. In such a case, the local interface 509 may be an appropriate network that facilitates communication between any two of the multiple first processors 106, multiple second processors 112, between any first processor 106, any second processor 112, and any of the memories 506, or between any two of the memories 506, etc. The local interface 509 may comprise additional systems designed to coordinate this communication, including, for example, performing load balancing. The first processor 106 and/or the second processor 112, may be of electrical or of some other available construction.

Although the decoding manager 115, the video transcoder 113, the audio decoder 114, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the video decoder 100 and the video transcoder 113. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a first processor 106 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the decoding manager 115, the video transcoder 113, and the audio decoder 114, that comprises software or code can be embodied in any computer-readable medium for use by or in connection with an instruction execution system such as, for example, a first processor 106 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. In some embodiments, the computer-readable medium can comprise transitory propagation media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
   first processing circuitry configured to:
   receive a video stream encoded using a first encoding profile corresponding to AVS1-P16;
   transcode the video stream from the first encoding profile to a second encoding profile corresponding to AVS1-P2, by converting a header of a network abstraction layer (NAL) unit in the video stream from an AVS1-P16 header format to an AVS1-P2 header format; and
   store the transcoded video stream in an output buffer;
   second processing circuitry configured to:
   receive the transcoded video stream from the output buffer; and
   decode the transcoded video stream according to the second encoding profile; and
   wherein the first encoding profile is unsupported by the second processing circuitry.

2. The system of claim 1, wherein the transcoding comprises:
   decoding a plurality of syntax elements encoded using advanced entropy coding (AEC); and
   encoding the decoded plurality of syntax elements using context-based adaptive two-dimensional variable length coding (CA-2D-VLC).

3. The system of claim 1, wherein first processing circuitry is further configured to:
   determine whether adaptive weighted quantization is enabled for the video stream; and
   configure the transcoding of the video stream to be a lossy process in response to determining that adaptive weighted quantization is enabled.

4. The system of claim 1, wherein second processing circuitry is further configured to:
   determine whether adaptive weighted quantization is enabled for the transcoded video stream; and
   configure the decoding of the transcoded video stream to be a lossy process in response to determining that adaptive weighted quantization is enabled.

5. The system of claim 1, wherein the first processing circuitry is further configured to:
   receive an audio stream corresponding to the video stream; and
   decode the audio stream.

6. The system of claim 5, wherein the first processing circuitry comprises a single host processor, and the single host processor is configured to perform the transcoding of the video stream and the decoding of the audio stream.

7. The system of claim 5, further comprising a decoding manager configured to synchronize the decoding of the audio stream with the transcoding of the video stream.

8. The system of claim 1, wherein the video stream corresponds to a first video stream, and the first processing circuitry is further configured to:
   receive a second video stream encoded using the first encoding profile; and
   transcode the second video stream from the first encoding profile to a second encoding profile in parallel with the transcoding of the first video stream; and
   store the second transcoded video stream in the output buffer.

9. The system of claim 8, further comprising a decoding manager configured to synchronize the transcoding of the first video stream with the transcoding of the second video stream.

10. A method, comprising:
    receiving, by first processing circuitry of a video processing device, a video stream encoded according to a first encoding profile corresponding to AVS1-P16;
    transcoding, by the first processing circuitry, the video stream from the first encoding profile to a second encoding profile corresponding to AVS1-P2, by converting a header of a network abstraction layer (NAL) unit in the video stream from an AVS1-P16 header format to an AVS1-P2 header format;
    providing, by the first processing circuitry, the transcoded video stream to an output buffer;
    receiving, by second processing circuitry of the video processing device, the transcoded video stream from the output buffer; and
    decoding, by the second processing circuitry, the transcoded video stream, the first encoding profile being unsupported by the second processing circuitry.

11. The method of claim 10, further comprising allocating, by the first processing circuitry, the output buffer according to a linear function based at least in part on an input network abstraction layer (NAL) unit size parameter and a picture size parameter.

12. The method of claim 10, further comprising updating the second processing circuitry to support decoding of a header format associated with the first encoding profile, the transcoded video stream employing the header format.

13. The method of claim 10, further comprising synchronizing, by a decoding manager of the video processing device, decoding of an audio stream by the first processing circuitry with decoding of the transcoded video stream by the second processing circuitry, the audio stream corresponding to the video stream.

14. The system of claim 1, wherein the second processing circuitry is configured to receive the transcoded video stream directly from the output buffer.

15. The method of claim 10, wherein the receiving the transcoded video stream from the output buffer includes receiving, by second processing circuitry of the video processing device, the transcoded video stream directly from the output buffer.

* * * * *